3,058,797
PROCESS FOR THE MANUFACTURE OF FAST
BLACK DYEINGS
Helmut Gies, Hofheim (Taunus), and Wilhelm Happe, Schwalbach (Taunus), Germany, assignors to Farbwerke Hoechst Aktiengesellschaft vormals Meister Lucius & Brüning, Frankfurt am Main, Germany, a corporation of Germany
No Drawing. Filed Jan. 21, 1960, Ser. No. 3,715
Claims priority, application Germany Jan. 23, 1959
2 Claims. (Cl. 8—1)

The present invention relates to a process for the manufacture of fast black dyeings.

It was found that fast black dyeings can be produced on native protein fibers, such as wool and silk, on shaped structures, such as fibers and sheets, of polyvinylchloride, polyethylene, polypropylene, polyamides, polyurethanes, cellulose esters or linear polyesters, especially polyethylene terephthalates, or on any mixtures of native protein fibers and fibrous materials consisting of polyamides, polyurethanes, cellulose esters and linear polyesters, especially polyethylene terephthalates, when a quinone-anil-N-halogen imide of the general formula

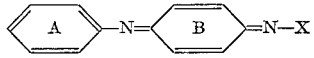

in which the nuclei A and B may be substituted by alkyl groups, alkoxy groups or halogen atoms and X represents a chlorine or bromine atom, is reacted on said fibers, shaped structures or mixtures thereof with compounds containing a reactive hydrogen atom.

As compounds containing a reactive hydrogen atom there may be mentioned, for example, aniline, dimethylaniline, paranitraniline, benzidine, 1-naphthylamine, 4-aminodiphenylamine, 2-aminoanthraquinone, phenol, resorcinol, 2-hydroxynaphthalene, phenylmethylpyrazolone, aceto-acetic acid anilide, benzoic acid, acetic acid or sulfuric acid.

When dyeing native protein fibers and shaped structures of polyvinyl chloride, polyethylene, polypropylene, cellulose esters or linear polyesters it is immaterial whether there is first absorbed by the fiber the N-halogen imide or the compound with the reactive hydrogen atom. However, when dyeing shaped structures of polyamides or polyurethanes, as well as the mixtures of fibers and fibrous materials already mentioned, it is advantageous to apply the compounds with the reactive hydrogen atom first on the substratum to be dyed and subsequently to develop the dyeing with a quinone-anil-N-halogen imide of said general formula. The quinone-anil-N-halogen imide is suitably applied from an aqueous suspension to the fiber or sheet at temperatures ranging from about 50° to 100° C. It should be avoided that the N-halogen imide acts for too long a period on the fiber or sheet since the N-halogen imides polymerize slowly in an aqueous suspension which causes dyeings of a poor fastness to rubbing and a contamination of the dyeing apparatus.

For the preparation of the aqueous suspensions, there is suitably used a granular product produced by melting together 35 parts by weight of quinone-anil-N-halogen imide with 65 parts by weight of a condensation product of tributylphenol and ethylene oxide. When boiling said granular product with a little water, there is obtained a pseudo solution of the quinone-anil-N-halogen imide which, when poured into the liquor, produces an extremely fine dispersion.

It has long been known that quinone-anil-N-chlorimide can be converted by the action of hydrochloric acid or hydrochloride of aniline in an aqueous solution into emeraldine (dimerized N-phenyl-quinone-di-imine) ("Berichte der Deutschen Chemischen Gesellschaft," No. 40, page 295 (1907)). However, it could not be be foreseen that the compound, which had been described as being liable to rapid decomposition, is absorbed by the synthetic plastics cited with such a rapidity that its decomposition is prevented and that it can react in the fiber with the aforementioned developing agents to yield an ungreenable black.

The following examples serve to illustrate the invention, but they are not intended to limit it thereto:

*Example 1*

5 grams of a fabric of polyethylene glycol terephthalate are treated in a goods-to-liquor ratio of 1:40 with a suspension of 0.25 gram of quinone-anil-N-chlorimide in 200 cc. of water for 10 minutes at 100° C. The fabric which has been dyed a deep orange is rinsed and treated with a suspension of 0.25 gram of 4-amino-diphenylamine in 200 cc. of water for 15 minutes at 100° C. A beautiful black dyeing with a violet hue develops having a good stability to light and thermofixation. The dye liquor remains limpid and the apparatus is not soiled. The fastness to rubbing can still be improved by an after-treatment with a solution of sulphuric bichromate.

Instead of the quinone-anil-N-chlorimide, there may also be used its derivatives substituted at the quinoid or benzoid nucleus by alkyl groups, alkoxy groups or halogen atoms, such as, for example, quinone-4-methylanil-N - chlorimide, quinone - 4 - methoxyanil - N - chlorimide, 2 - methoxyquinone - anil - 1 - N - chlorimide or quinone-4-chloranil-N-chlorimide.

*Example 2*

5 grams of a fabric of polyethylene glycol terephthalate are treated in a goods-to-liquor ratio of 1:40 with a suspension of 0.25 gram of 4-amino-diphenylamine in 200 cc. of water at a pH of 7 to 8 with the addition of a small quantity of sodium dithionite as a stabilizer for 15 minutes at a temperature of 100° C. Then the fabric which has been dyed a weak yellow is rinsed and treated with a suspension of 0.25 gram of quinone-anil-N-bromimide in 200 cc. of water for 10 minutes at 100° C. A black dyeing is obtained having a very good fastness to light and sublimation. The fastness to rubbing can be improved by an after-treatment with a solution of sulfuric bichromate.

*Example 3*

5 grams of a fabric of polyethylene glycol terephthalate are treated in a goods-to-liquor ratio of 1:40 with a suspension of 0.375 gram of quinone-anil-N-chlorimide in 200 cc. of water for 10 minutes at 100° C.; then the quinone-anil-N-chlorimide still present in the liquor is reduced to 4-aminodiphenylamine by adding 0.75 gram of sodium dithionite in a solution alkaline with soda. A beautiful black dyeing having a good fastness to light, rubbing and sublimation develops on the fabric within a short period.

*Example 4*

5 grams of a low-pressure polyethylene sheet are treated at 90° C. with a suspension of 0.25 gram of quinone-anil-N-chlorimide in 200 cc. of water for 10 minutes. The sheet is rinsed and developed with a suspension of 0.25 gram of 4-aminodiphenylamine in 200 cc. of water for 5 minutes at 90° C. An entirely non-transparent sheet is obtained having a deep black shade.

*Example 5*

5 grams of a fabric of polyvinylchloride are treated at 60° C. in a goods-to-liquor ratio of 1:40 with a suspension of 0.5 gram of quinone-anil-N-chlorimide in 200 cc. of water. After 5 minutes the quinone-anil-N-chlorimide that has not yet been absorbed is reduced to 4-aminodiphenylamine by adding a solution of 1 gram of sodium dithionite alkaline with soda. In the course of 10 minutes, a beautiful, somewhat greenish black dyeing develops having a good fastness to rubbing and to light.

*Example 6*

In a cheese dyeing machine 300 grams of a yarn of polyethylene glycol terephthalate are treated at 100° C. for 15 minutes with a suspension of 21 grams of quinone-anil-N-chlorimide in 12 liters of water. The suspension is obtained by boiling 60 grams of a fused mass consisting of 35 parts of quinone-anil-N-chlorimide and 65 parts of a condensation product consisting of 1 mol of tributylphenol and 100 mols of ethylene oxide in 1 liter of water and pouring the hot pseudo solution into 11 liters of water.

Then 45 grams of sodium dithionite, dissolved in 1 liter of a 2 N-solution of sodium carbonate, are added and the whole is boiled for another 5 minutes. A deep black dyeing is obtained having a good fastness to rubbing, light and sublimation. The dyeing can, if necessary, still be toned with commercial dispersion dyestuffs. The quinone-anil-N-chlorimide can also be applied in the dyeliquor together with a commercial dispersion dyestuff.

*Example 7*

5 grams of cellulose triacetate are dyed as follows:
The carefully washed material is brought at 50° C. into a bath containing 0.05 gram of sodium carbonate, 0.15 gram of a condensation product consisting of 1 mol of ricinoleic acid and 35 mols of ethylene oxide as a dispersion agent and 0.25 gram of quinone-anil-N-chlorimide in 200 cc. of water. While turning the material to be dyed carefully, the temperature is raised within half an hour to about 98° C. and the material is dyed for 7 minutes at 98° C. An aqueous solution consisting of 2.5 grams of sodium carbonate and 1 gram of sodium dithionite is added to the liquor and the material is treated for another 15 minutes at 98° C. Then the material is after-treated for 15 minutes at 98° C. in a goods-to-liquor ratio of 1:40 in a fresh liquor containing per liter 100 grams of potassium bichromate, 100 grams of a sulfuric acid of 60° Bé. and 0.1 gram of a non-ionic washing agent. Then the material is rinsed in the cold.

The black dyeing obtained is distinguished by very good fastness properties. The fastness to rubbing is also very good.

*Example 8*

100 grams of a fabric of staple fibers of polyethylene glycol terephthalate are dyed in three passages on the padding machine the color box of which contains 100 grams of quinone-anil-N-chloramide, 100 grams of a condensation product of 1 mol of tributylphenol and 100 mols of ethylene oxide, 300 grams of cellulose methylether and 500 grams of water. The fabric is dried, then thermofixed for about 30 seconds at 200° C. and treated in a reducing bath containing 50 grams of sodium carbonate and 20 grams of sodium dithionite in 4 liters of water. A deep black dyeing is obtained which can, if necessary, be after-treated by oxidation according to Example 1 in order to improve the fastness to rubbing.

*Example 9*

30 grams of a mixed fabric consisting of 45 parts by weight of wool and 55 parts by weight of polyethylene glycol terephthalate are treated in a goods-to-liquor ratio of 1:30 with an aqueous emulsion of 1.5 grams of ortho-phenyl-phenol in a closed winch vat for 30 minutes at 100° C. The fabric is rinsed well at about 80° C. and then treated in a fresh liquor having a pH of about 8 with an aqueous suspension of 2.2 grams of quinone-anil-N-chlorimide for 15 minutes at 100° C. Then the material is rinsed twice at 80° C. and once at 20° C. and finally washed in a washing solution, containing per liter of water 4 grams of concentrated sulfuric acid and about 2 grams of a non-ionic washing agent (polyglycol ether). A dyeing fast to light and washing is obtained.

The shade of the black dyeing obtained is even fuller when, together with the ortho phenyl-phenol, there is applied 0.9 to 1.2 grams of a black 1:2 complex metal dyestuff, for example the mixed chromium complex compound of the azo dyestuffs 1-amino-2-hydroxy-6-nitro-napthalene - 4 - sulfonic acid→2 - hydroxy - naphthalene and 1 - amino - 2 - hydroxy - 3,5 - dinitrobenzene→2 - hydroxy-naphthalene according to French Patent No. 1,101,-955, and the pH value is gradually adjusted to about 6 in the course of said treatment at 100° C.

*Example 10*

30 grams of a fabric of polyamide fibers are treated, in a goods-to-liquor ratio of 1:30, with an emulsion of 1.5 grams of ortho-phenyl-phenol for 30 minutes at 100° C. in a closed winch vat. The fabric is rinsed well at about 80° C. and then treated in a fresh liquor with a suspension of 2.2 grams of quinone-anil-N-chlorimide for 15 minutes at 100° C. The fabric is rinsed twice at 80° C. and finally washed in a bath containing per liter of water 2 grams of a non-ionic washing agent (polyglycol ether). A black dyeing of a good fastness to light and washing is obtained.

When the ortho-phenyl-phenol is replaced by an aromatic amine, for example para-phenylene-diamine, there is likewise obtained a fast black dyeing of a somewhat brownish shade.

*Example 11*

30 grams of a woolen fabric are treated in a goods-to-liquor ratio of 1:30 with an aqueous suspension of 2.2 grams of quinone-anil-N-chlorimide in a closed winch vat at 100° C. for 15 minutes. Then 1 gram of tartaric acid diethyl ester is added and the fabric dyed for another 30 minutes at 100° C. A black dyeing of a deep shade is obtained which, after having twice been rinsed and washed in a hot liquor containing per liter of water 2 grams of a non-ionic washing agent (polyglycol ether) and 4 grams of concentrated sulfuric acid, possesses a good fastness to rubbing and to light.

We claim:
1. A process for the manufacture of fast black dyeings on shaped structures consisting of a material selected from the group consisting of native protein, polyvinyl chloride, polyethylene, polypropylene, polyamides, polyurethanes, acetyl cellulose and polyethylene terephthalates, and of any mixtures of fibres consisting of a material selected from the group consisting of native protein, polyamides, polyurethanes, acetyl cellulose and polyethylene terephthalates, which comprises reacting a quinone-anil-N-halogen imide of the general formula

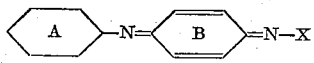

wherein the nuclei A and B may be substituted by a member selected from the group consisting of alkyl, alkoxy and halogen, and X represents a member selected from the group consisting of chlorine and bromine, on said shaped structures and mixtures of fibres at a temperature in the range from about 50° C. to about 100° C. with a compound containing a reactive hydrogen atom, said compound being selected from the group consisting of aniline, dimethylaniline, nitraniline, benzidine, naphthylamine, aminodiphenylamine, aminoanthraquinone, phenol, resorcinol, hydroxynaphthalene, phenylmethylpyrazolone, aceto-acetic acid anilide, benzoic acid, acetic acid and sulfuric acid.

2. A process as claimed in claim 1, wherein the material dyed is a blend of wool and polyethylene terephthalate fibres.

No references cited.